(12) United States Patent
Lee et al.

(10) Patent No.: US 7,547,902 B2
(45) Date of Patent: Jun. 16, 2009

(54) CURRENT TRANSFER RATIO TEMPERATURE COEFFICIENT COMPENSATION METHOD AND APPARATUS FOR AN OPTOCOUPLER

(75) Inventors: Kah Weng Lee, Singapore (SG); Bin Zhang, Singapore (SG)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/950,477

(22) Filed: Dec. 5, 2007

(65) Prior Publication Data

US 2008/0087851 A1 Apr. 17, 2008

Related U.S. Application Data

(62) Division of application No. 11/280,130, filed on Nov. 15, 2005, now Pat. No. 7,326,947.

(51) Int. Cl.
*G02B 27/00* (2006.01)
*H01J 40/14* (2006.01)

(52) U.S. Cl. .................... 250/551; 250/214 R
(58) Field of Classification Search ............... 250/551, 250/214 R, 214 C, 214.1; 327/514, 512, 327/513
See application file for complete search history.

(56) References Cited

U.S. PATENT DOCUMENTS

| 4,652,764 | A  | * | 3/1987  | Nagano ................. 250/551 |
| 5,089,926 | A  | * | 2/1992  | Kugelman .............. 361/87 |
| 5,949,085 | A  |   | 9/1999  | Barrett |
| 5,949,225 | A  |   | 9/1999  | Sawtell |
| 6,414,450 | B1 |   | 7/2002  | De Wulf |
| 7,023,005 | B2 | * | 4/2006  | Williams et al. ........ 250/551 |
| 2001/0038081 | A1 |   | 11/2001 | De Wulf |
| 2003/0117698 | A1 | * | 6/2003  | Williams et al. ....... 359/341.41 |
| 2006/0250265 | A1 |   | 11/2006 | Balakrishnan et al. |

* cited by examiner

*Primary Examiner*—Que T Le
*Assistant Examiner*—Pascal M Bui-Pho

(57) ABSTRACT

An optocoupler system includes a buffer, isolation, and a detector. The system includes a current transfer ratio (CTR) with a temperature coefficient. The buffer includes a light source that generates light that passes through the isolation. A detector receives light that passes through the isolation and generates an output signal based on the received light. A current transfer ratio (CTR) temperature coefficient compensation mechanism is provided that generates a base signal with a temperature coefficient that compensates the temperature coefficient of the CTR.

12 Claims, 4 Drawing Sheets

CURRENT TRANSFER RATIO TEMPERATURE COEFFICIENT COMPENSATION METHOD AND APPARATUS FOR AN OPTOCOUPLER

This is a Divisional of application Ser. No. 11/280,130, filed on Nov. 15, 2005, now U.S. Pat. No. 7,326,947 the entire disclosure of which is incorporated herein by reference.

BACKGROUND OF THE INVENTION

Optocoupler systems are useful for many different applications wherein electrical isolation is needed between a first circuit and a second circuit. One exemplary application is to use an optocoupler to electrically isolate a user interface (e.g., a logic interface) from a high voltage signal.

Optocoupler systems include a first circuit and a second circuit that are electrically isolated from each other. The first circuit includes a light emitting diode (LED) that is coupled to a LED current source. The first circuit is optically coupled to a second circuit. The second circuit includes a photodiode (PD). For example, the LED emits light, which impinges on the photodiode, causing a current through the photodiode (e.g., a photodiode current). The second circuit also includes a transimpedance amplifier circuit that is coupled to the photodiode to generate an output voltage signal that is based on the photodiode current. The second circuit also includes a current source that generates a reference current Typically, the photodiode current is compared with the reference signal, and this comparison is utilized to generate the output voltage signal.

An optocoupler system includes three primary components: 1) buffer, 2) isolation, and 3) detector. The buffer provides a constant current to drive a light source (e.g., a light emitting diode (LED)). This current is referred to as the LED current and causes the LED to light up. The light passes through the isolation that can be, for example, a transparent substance. It is noted that the light undergoes a certain amount of attenuation before receiving the detector. This attenuation is one primary cause for the optocoupler system to have a current transfer ratio (CTR).

The detector converts the received light into corresponding electrical signals (e.g., a current signal and a voltage signal). The detector compares the voltage signal corresponding to the received light to a reference signal and generates an output signal (e.g., a "1" or "0") that is based on the comparison.

However, the design of optocoupler systems poses significant challenges and introduces many issues and design concerns. One problem encountered in existing optocoupler systems is that the current transfer ratio of the optocoupler system changes with respect to temperature. In other words, the ratio between the photodiode current and the LED drive current is a function of temperature. One disadvantage of prior art optocouplers is that the LED drive current does not compensate for the effect of temperature variation on the current transfer ratio. To account for this variation, these optocouplers set a reference current to a lower value than would otherwise be set when the variation is not present. Consequently, the detector is more susceptible to ground noise, which is undesirable.

Based on the foregoing, there remains a need for a current transfer ratio temperature compensation method and apparatus that overcomes the disadvantages set forth previously.

SUMMARY OF THE INVENTION

According to one embodiment of the present invention, an optocoupler system that includes current transfer ratio (CTR) temperature coefficient adjustment mechanism is described. The optocoupler system includes a buffer, isolation, and a detector. The optocoupler system includes a current transfer ratio (CTR) with a temperature coefficient. The buffer includes a light source that generates light that passes through the isolation. A detector receives light that passes through the isolation and generates an output signal based on the received light. A current transfer ratio temperature coefficient (CTRTC) compensation mechanism is provided that generates a base signal with a temperature coefficient that compensates the temperature coefficient of the CTR.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION

A current transfer ratio temperature coefficient compensation mechanism method and apparatus are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Optocoupler System 100

Figure 1:
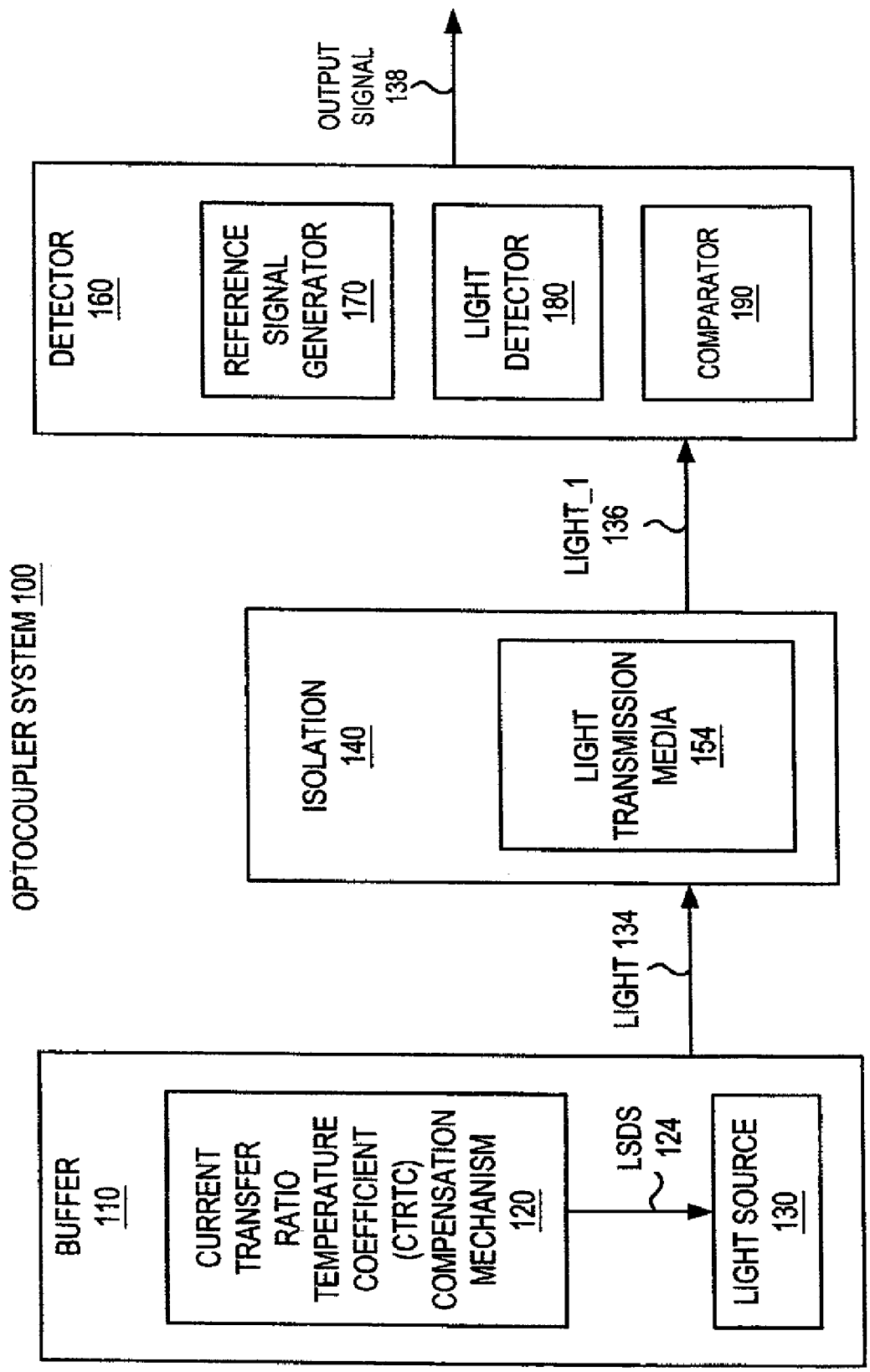
FIG. 1 illustrates a block diagram of an optocoupler system that includes a current transfer ratio temperature compensation mechanism according to one embodiment of the invention.

FIG. 1 illustrates a block diagram of an optocoupler system 100 that includes a current transfer ratio temperature compensation (CTRTC) mechanism 120 according to one embodiment of the invention. The optocoupler system 100 includes three main components or sections: a buffer 110, isolation 140 and a detector 160. The buffer 110 generates a light 134 that passes through the isolation 140, which attenuates the light 134 to generate an attenuated light 136 that is denoted light_1. The isolation 140 can include a light transmission media 154. The detector 160 receives the attenuated light_1 136 and responsive thereto generates an output signal 138 (e.g., a current signal or voltage signal that represents the light detected by detector 160) that is based on the attenuated light_1 136.

The current transfer ratio (CTR) is the ratio between a signal (e.g., a current signal that represents the detected light) generated by the light detector 180 and a drive signal (e.g., a light source drive current signal) provided to drive the light source 130. For example, when a light emitting diode (LED) is provided with a drive current of about 1 mA, the light detector may generate a current of about 1 micro amperes. The CTR is dependent on factors such as light transmission and other effects, such as the quantum efficiency of the photo detector and the quantum efficiency of the light source (e.g., LED). The current transfer ratio (CTR) is also a function of temperature. For example, the current transfer ratio (CTR) can vary or change as the temperature (e.g., the operating temperature of the optocoupler system 100) changes. This variation in CTR due to temperature variations is referred to as a temperature coefficient or "tempco" of the CTR. In this regard, the current transfer ratio (CTR) includes a temperature coefficient. In one example, the CTR has a negative temperature coefficient that is about −3500 ppm.

The buffer 110 includes a light source 130 (e.g., a light emitting diode (LED)) that generates light 134. The buffer 110 also includes the current transfer ratio temperature coefficient (CTRTC) compensation mechanism 120 that generates a light source drive signal (LSDS) 124 with a temperature coefficient that compensates the temperature coefficient of the current transfer ratio (CTR).

The light 134 generated by the light source 130 then passes through the isolation 140, which in one example, is a transparent substance. As described previously, the light 134 undergoes a certain amount of attenuation before reaching the detector 160.

Figure 2:
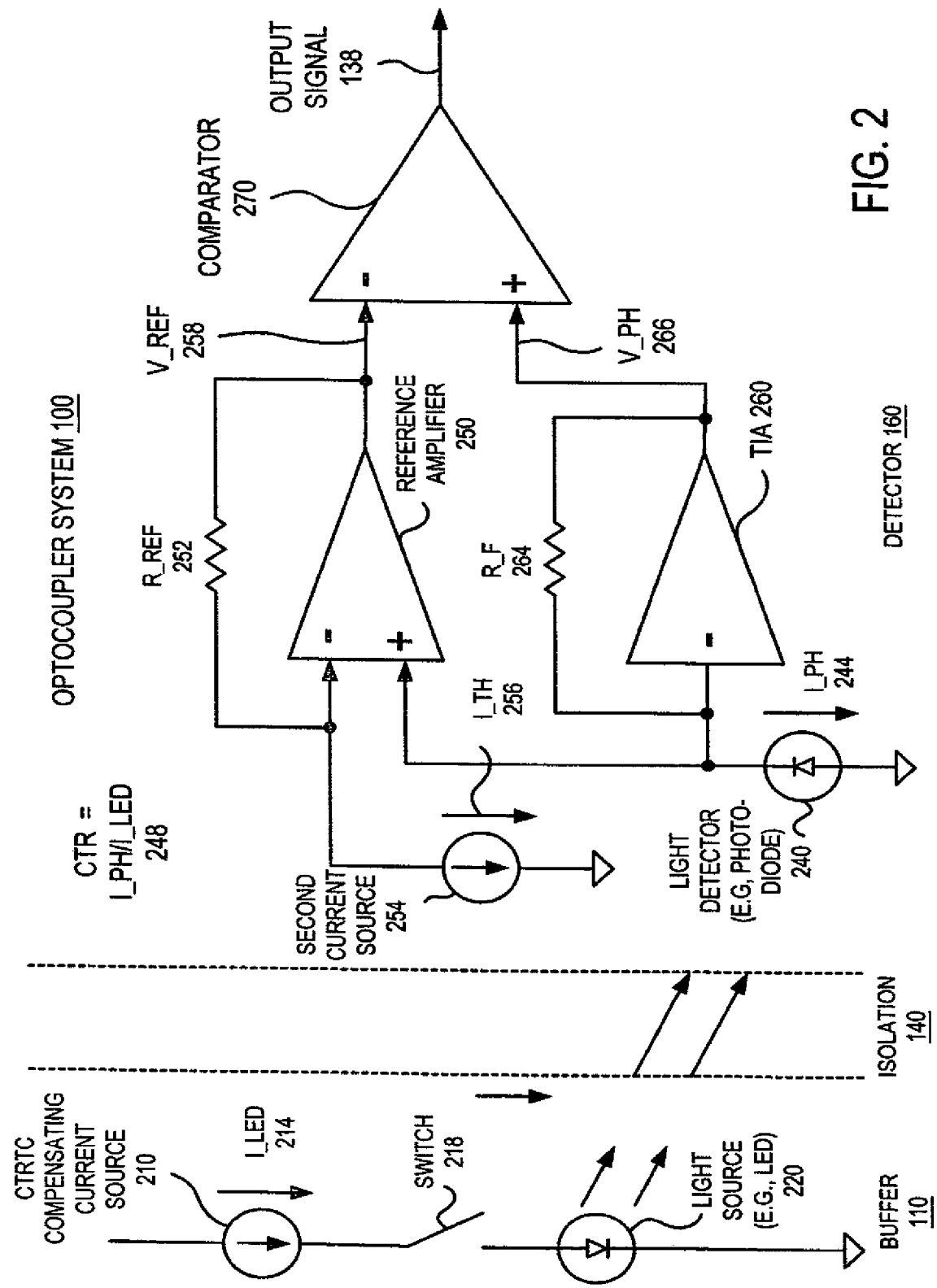
FIG. 2 illustrates in greater detail the optocoupler system of FIG. 1 according to one embodiment of the invention.

FIG. 2 illustrates in greater detail the optocoupler system of FIG. 1 according to one embodiment of the invention. In this embodiment, the light source drive signal (LSDS 124) is a current signal 214 that is denoted I_LED. The current transfer ratio temperature coefficient (CTRTC) compensation mechanism 120 is implemented in this embodiment with a light source drive signal generator 210 that generates the I_LED signal 214. The tempco of the I_LED signal 214 matches a reference current denoted ITH and also the CTR for both process variation and temperature variation.

In one embodiment, the light source drive signal generator 210 is a current source that provides a constant current (I_LED) to the light source 130 to light up the light source 130. The light source drive signal (LSDS) generator 210 is described in greater detail hereinafter with reference to FIG. 3.

In this embodiment, the detector 160 includes a light detector 240, a reference amplifier 250, a second current source 254, a transimpedance amplifier (TIA) 260 and a comparator 270. The light detector 240 can be implemented with a photodiode. The photodiode 240 includes a first electrode that is coupled to a predetermined power signal (e.g., a ground signal) and a second electrode. The photodiode 240 receives the light from the isolation 140 and converts the light into a corresponding electrical signal. For example, the detector 160 converts received light into a current (I_LPD) 244 and a voltage V_ph 266, where V_ph is equal to IPD*R_f.

The reference amplifier 250 includes an inverting input, a non-inverting input, and an output. The inverting input is coupled to the second current source 254, which can be implemented with a battery and resistor connected in series, and the non-inverting input is coupled to the second electrode of the photodiode 240. The second current source 254 generates a current denoted I_TH that can be based on a resistor. A reference resistor 252 (R_REF) is coupled across the inverting input and an output of the reference amplifier 250. The reference amplifier 250 generates a reference signal 258 (e.g., a reference voltage signal, V_REF 258) at the output. The reference voltage (V_REF) 258 may be determined by the following expression: V_REF=ITH*R_REF.

The transimpedance amplifier (TIA) 260 includes an inverting input and an output. The inverting input is coupled to the second electrode of the photodiode 240. A resistor 264 (R_F) is coupled across the inverting input and an output of the TIA 260. The TIA 260 detects the photo diode current, I_PH, and based thereon generates a photodiode signal 266 (e.g., a photodiode voltage signal, V_PH) at the output. The photodiode voltage (V_PH) may be determined by the following expression: V_PH=IPH*R_F.

The comparator 270 includes an inverting input that is coupled to the output of the reference amplifier 250 and a non-inverting input that is coupled to the output of the transimpedance amplifier 260. The comparator 270 includes an output for generating an output signal 138. The comparator 270 compares the V_REF with V_PH to generate either a logic high signal (e.g., a logic "1" signal) or a logic low signal (e.g., a logic "0" signal).

It is noted that the I_LED signal 214 may be a function of a first resistor (R1). Also, the I_TH signal 256 may be a function of a second resistor (R2). In one embodiment, the first resistor and second resistor are matched. Since both resistor R1 and resistor R2 are matched, both the I_LED signal and the I_Th signal are matched and will generally vary in a similar fashion across different process variations and temperature variations.

It is noted that the I_PH signal is a function of both the I_LED signal and the current transfer ratio (CTR). Without the mechanism according to the invention, there is no compensation for the effect of CTR due to temperature variation. In this embodiment, the CTR has a temperature coefficient of about −3500 ppm. In this regard, the I_TH current signal is set to a lower value to account for the variation in CTR in the prior art systems, thereby making the detector more susceptible to ground noise.

Figure 3:
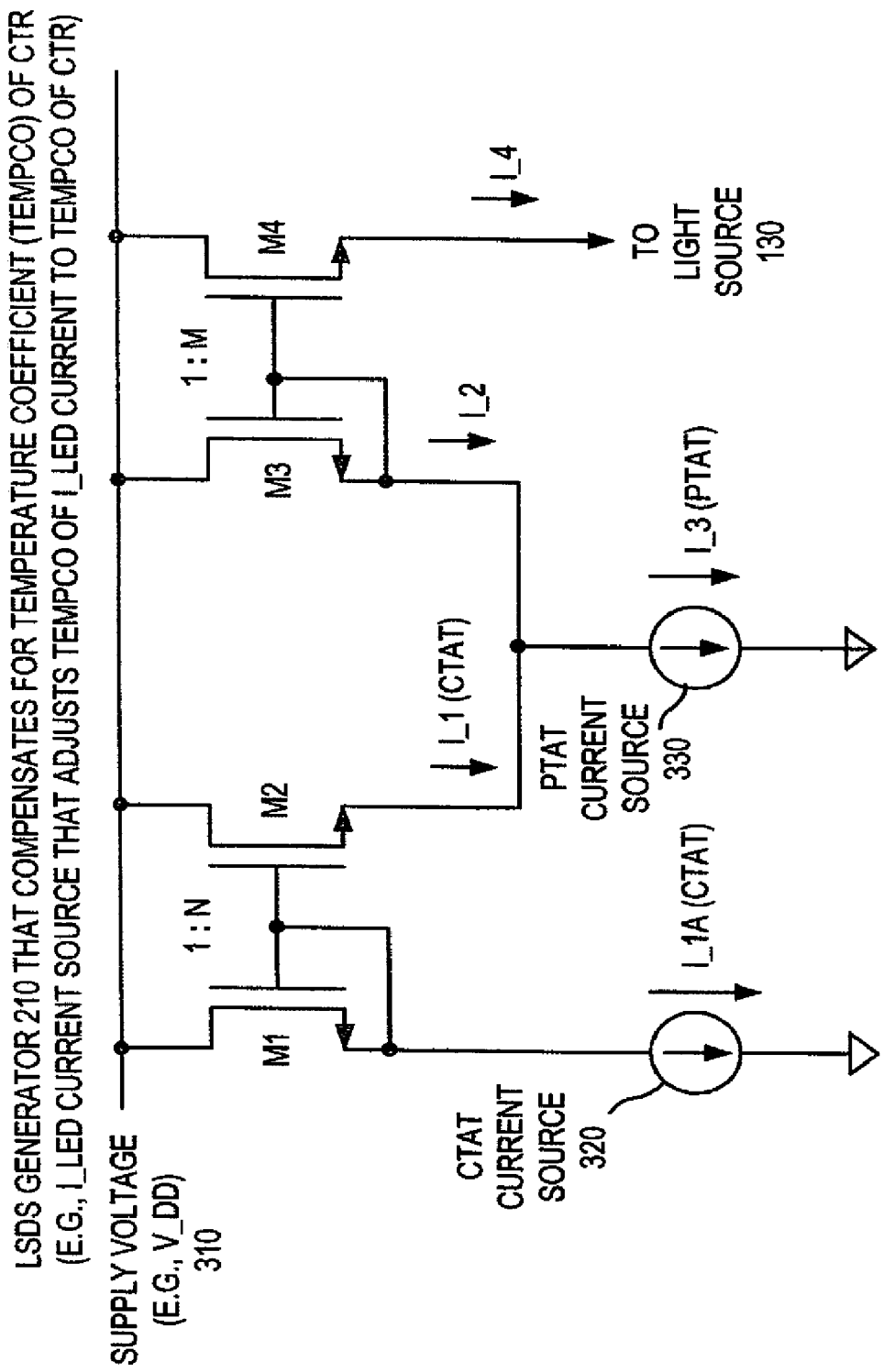
FIG. 3 illustrates an exemplary circuit diagram the current transfer ratio temperature coefficient (CTRTC) compensation mechanism according to one embodiment of the invention.

Current Transfer Ratio Temperature Coefficient (CTRTC) Compensation Mechanism FIG. 3 illustrates an exemplary circuit diagram the current transfer ratio temperature coefficient (CTRTC) compensation mechanism according to one embodiment of the invention. In one embodiment, the CIR temperature coefficient compensation mechanism is implemented with a light source drive signal (LSDS) generator that compensates for temperature coefficient of the CTR. For example, the light source drive signal (LSDS) generator can be implemented with an I_LED current source 214 that adjusts the tempco of the I_LED current to compensate for the tempco of the CTR.

The I_LED current source 214 adjusts the temperature coefficient of the I_LED current to match the tempco of the CTR. The mechanism 214 includes a first current source 320 (e.g., a complementary to absolute temperature (CTAT) current source), which generates a complementary to absolute temperature (CTAT) signal (e.g., a CTAT current signal). The first current source 320 may be implemented by a voltage source connected in series with a resistor. The mechanism 214 also includes a second current source 330 (e.g., a proportional to absolute temperature (PTAT) current source), which generates a proportional to absolute temperature (PTAT) signal (e.g., a PTAT current signal). The second current source 330 may be implemented by a voltage source connected in series with a resistor.

Transistor M1 and transistor M2 form a current mirror. By adjusting the ratio of N, a particular value for the amount of the CTAT current for I_1 (I_1(CTAT)) may be specified. For example, current I_1 is equal to about N*I_1A.

Current I_3 matches with current I_TH of the detector 160 as both of them are a function of the same type of bias circuit and resistor. It is noted that current I_2 is proportional to I_3 and matches or generally corresponds with current I_TH.

According to one embodiment, current I_3 is a combination of current I_1 and current I_2. By adjusting current I_1, a predetermined or required temperature coefficient of current $I\_2$ may be attained or selectively achieved. For example, current $I\_2$ may be given by the following expression: $I\_2=I\_3-I\_1$, where current $I\_2$ is proportional to $I\_4$, which is the light source drive signal (e.g., an I_LED current signal).

According to one embodiment, the following expression is also true:

$$(\text{Delta } I\_2/\text{Delta } T)/I\_2 = (\text{Delta } I\_3/\text{Delta } T)/I\_2 - (\text{Delta } I\_1/\text{Delta } T)/I\_2$$

Term A=Term B−Term C

In order to compensate the −3500 ppm of the CTR, the I_LED or $I\_2$ needs to have an additional temperature coefficient (tempco) of +3500 ppm. With reference to the above equation, term A ($I\_2$) is the difference of term B and term C. Term B ($I\_3$, PTAT) generally tracks closely the reference current I_TH (also referred to threshold current) of the detector since both of them are a function of similar resistors. Term C generally generates a positive temperature coefficient (tempco) due to the negative sign and the negative tempco of $I\_1$. By changing the value of $I\_2$, term C can be modified to match the tempco of the CTR. For example, when the tempco is not sufficient, $I\_2$ can be reduced in order to increase term C. Consequently, the tempco increases. $I\_2$ can be reduced by increasing $I\_1$. It is noted that once a required tempco of $I\_2$ is achieved, the I_LED current may be increased by increasing the size of transistor M4. For example, $I\_4$ is equal to $M*I\_2$. In one embodiment, the temperature coefficient of the I_LED current can increase by about +3500 ppm to compensate for a CTR tempco in the range of about −2000 ppm to about −5000 ppm.

Figure 4:
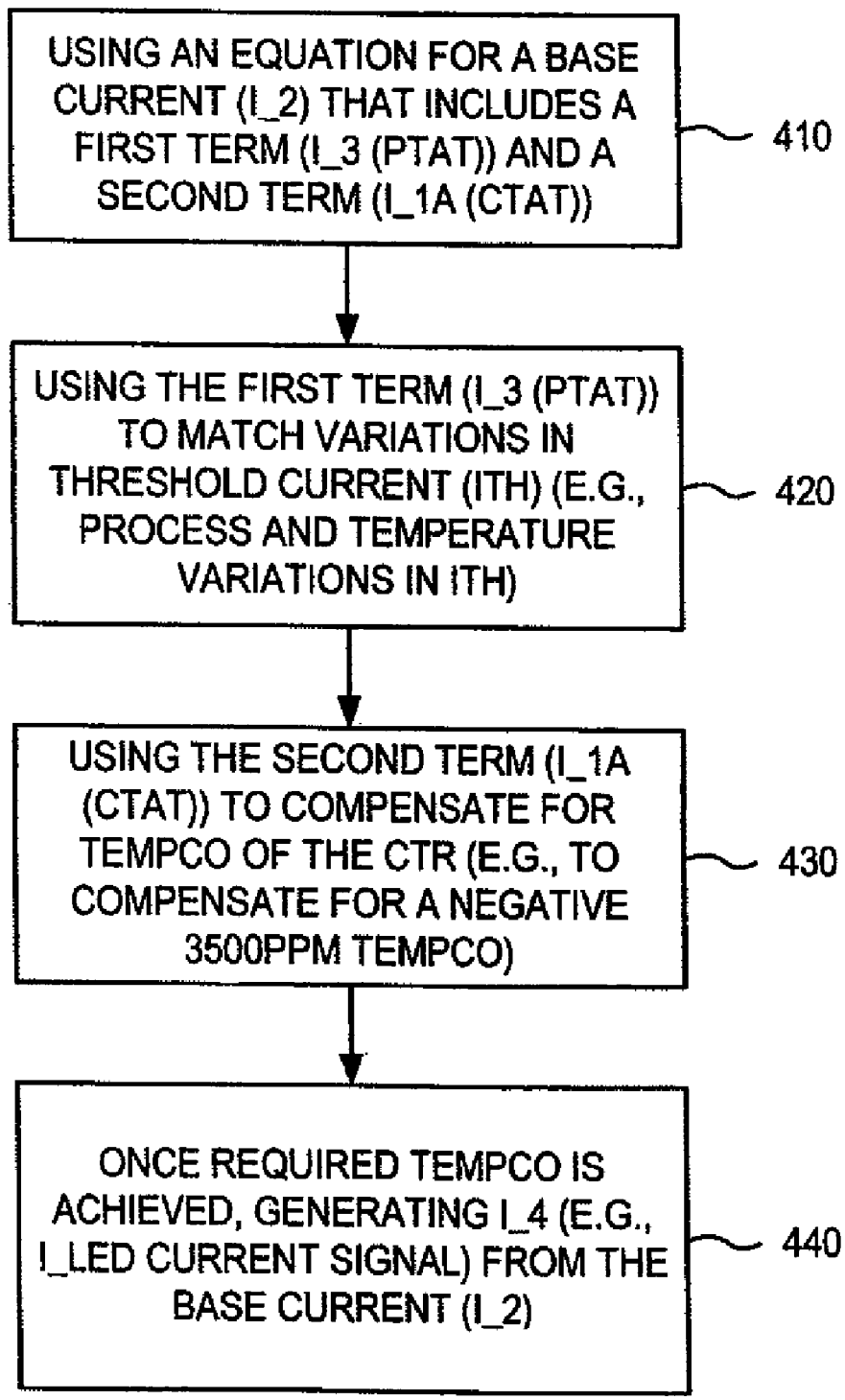
FIG. 4 is a flowchart illustrating a method performed by the current transfer ratio temperature coefficient compensation mechanism according to one embodiment of the invention.

Processing Performed by the CTR Temperature Coefficient Compensation Mechanism FIG. 4 is a flowchart illustrating a method performed by the current transfer ratio temperature compensation (CTRTC) mechanism to generate a light source drive signal (e.g., an I_LED current signal) according to one embodiment of the invention. In step 410, a base current ($I\_2$) is generated by employing an equation that includes a first term ($I\_3$ (PTAT)) and a second term ($I\_1A$ (CTAT)). In step 420, the first term ($I\_3$ (PTAT)) is utilized to match variations in the threshold current (I_TH current), such as process and temperature variations in the I_TH current. A PTAT current source 330 may be utilized to generate the $I\_3$ (PTAT) signal.

In step 430, the second term ($I\_A1$ (CTAT)) is utilized to compensate for the temperature coefficient (tempco) of the CTR. A CTAT current source 320 may be utilized to generate the $I\_1A$ (CTAT) signal. It is noted that the compensation mechanisms according to the invention can partially compensate, completely compensate, or over-compensate the temperature coefficient (tempco) of the CTR depending on the requirements of a particular application. In one embodiment, step 430 includes generating a positive temperature coefficient (tempco) of about 3500 ppm in order to compensate for a negative 3500 ppm temperature coefficient (tempco) of the CTR.

In step 440, once the required temperature coefficient (tempco) is achieved, the base current ($I\_2$) is adjusted (e.g., increased or decreased) to a required amount to generate a drive signal, $I\_4$ (e.g., I_LED current signal). A current mirror formed by transistors M3 and M4 can be utilized to generate $I\_4$ from $I\_2$.

In one embodiment, the light source driving signal generation mechanism adjusts the temperature coefficient of the LSDS signal to compensate for the temperature coefficient of the CTR. In yet another embodiment, the light source driving signal generation mechanism adjusts the temperature coefficient of the LSDS signal to compensate for either process variation or temperature variation in the optocoupler.

The mechanisms according to the invention are useful in various applications, such as applications or systems where two ground potentials are needed, applications where level shifting is required, other applications that require electrical isolation between a first circuit and a second circuit. For example, an optocoupler system according to the invention may be implemented to provide isolation between a logic circuit (e.g., with standard 5 volt power signal) and an analog control circuit (e.g., a motor control circuit or other industrial application) that operates with higher power signals and perhaps with a floating ground. The mechanisms according to the invention are also useful in applications where isolation is required between a high voltage signal and a human interface (e.g., a logic interface).

In the foregoing specification, the invention has been described with reference to specific embodiments thereof. It will, however, be evident that various modifications and changes may be made thereto without departing from the broader scope of the invention. The specification and drawings are, accordingly, to be regarded in an illustrative rather than a restrictive sense.

What is claimed is:

1. A method for compensating the current transfer ratio temperature coefficient; wherein the method includes:
   generating a first signal that matches one of process variations and temperature variations in a threshold signal;
   generating a second signal that compensates for temperature coefficient of a current transfer ratio;
   generating a base signal based on the first signal and the second signal;
   wherein the base signal compensates the temperature coefficient of the CTR.

2. The method of claim 1 further comprising:
   increasing the base signal by a predetermined amount to generate a light source driving signal.

3. The method of claim 1 wherein compensating for the temperature coefficient of the CTR includes generating a signal that selectively increases the temperature coefficient of the base signal to compensate for a temperature coefficient of the CTR.

4. The method of claim 1 wherein compensating for the temperature coefficient of the CTR includes generating a signal that selectively increases the temperature coefficient of the base signal to partially compensate for the temperature coefficient of the CTR.

5. The method of claim 1 wherein compensating for the temperature coefficient of the CTR includes generating a signal that selectively increases the temperature coefficient of the base signal to completely compensate for the temperature coefficient of the CTR.

6. The method of claim 1 wherein compensating for the temperature coefficient of the CTR includes generating a signal that selectively increases the temperature coefficient of the base signal to over compensate for the temperature coefficient of the CTR.

7. A current transfer ratio (CTR) temperature coefficient compensation apparatus in an optocoupler with a current transfer ratio (CTR) between a light source drive signal and a light detector signal, the current transfer ratio (CTR) having a temperature coefficient, the apparatus comprising:
   a first current source that generates a first signal that matches variations in a reference signal; and a second current source that generates a second signal that selectively compensates the temperature coefficient of the CTR;

wherein a base signal is generated by the apparatus that is based on the first signal and the second signal.

8. The apparatus of claim 7 further comprising:

a current mirror that receives the base signal and selectively increases the base signal to generate a light source drive signal at a predetermined level.

9. The apparatus of claim 7 wherein the second current source generates a second signal that selectively increases the temperature coefficient of the base signal to compensate for a temperature coefficient of the CTR.

10. The apparatus of claim 7 wherein the second current source generates a second signal that selectively increases the temperature coefficient of the base signal to partially compensate for the temperature coefficient of the CTR.

11. The apparatus of claim 7 wherein the second current source generates a second signal that selectively increases the temperature coefficient of the base signal to completely compensate for the temperature coefficient of the CTR.

12. The apparatus of claim 7 wherein the second current source generates a second signal that selectively increases the temperature coefficient of the base signal to overcompensate for the temperature coefficient of the CTR.

* * * * *